(12) United States Patent
Lee

(10) Patent No.: US 8,044,617 B2
(45) Date of Patent: Oct. 25, 2011

(54) MOTOR CONTROL CIRCUIT AND OPERATION METHOD THEREOF

(75) Inventor: Ching-Tsan Lee, Hsin-Chu (TW)

(73) Assignee: Leadtrend Technology Corp., Hsin-Chu (TW)

( * ) Notice: Subject to any disclaimer, the term of this patent is extended or adjusted under 35 U.S.C. 154(b) by 566 days.

(21) Appl. No.: 12/208,330

(22) Filed: Sep. 10, 2008

(65) Prior Publication Data

US 2009/0267544 A1  Oct. 29, 2009

(30) Foreign Application Priority Data

Apr. 23, 2008  (TW) ................................ 97114805 A

(51) Int. Cl.
*H02P 3/12* (2006.01)
(52) U.S. Cl. .................... 318/380; 318/293; 318/379
(58) Field of Classification Search .................. 318/375, 318/379, 380, 280–295
See application file for complete search history.

(56) References Cited

U.S. PATENT DOCUMENTS

| | | | |
|---|---|---|---|
| 3,229,181 A * | 1/1966 | Evans | 318/293 |
| 4,494,058 A * | 1/1985 | Berti | 318/372 |
| 4,581,565 A * | 4/1986 | Van Pelt et al. | 318/294 |
| 4,767,970 A * | 8/1988 | Rodal | 318/375 |
| 6,175,204 B1 * | 1/2001 | Calamatas | 318/375 |
| 6,724,169 B2 * | 4/2004 | Majumdar et al. | 318/811 |
| 7,161,323 B2 * | 1/2007 | Ajima et al. | 318/629 |
| 7,741,796 B2 * | 6/2010 | Poyhonen et al. | 318/380 |
| 2009/0309523 A1 * | 12/2009 | Ikei | 318/380 |

* cited by examiner

*Primary Examiner* — Bentsu Ro
(74) *Attorney, Agent, or Firm* — Winston Hsu; Scott Margo

(57) ABSTRACT

A motor control circuit for controlling a motor includes a brake circuit and a control circuit. The brake circuit is for making the motor enter a braking state. The control circuit is for detecting a residual energy of the motor in the braking state. When the residual energy conforms to a predetermined criterion, the control circuit makes the motor exit the braking state.

12 Claims, 9 Drawing Sheets

US 8,044,617 B2

MOTOR CONTROL CIRCUIT AND OPERATION METHOD THEREOF

BACKGROUND OF THE INVENTION

1. Field of the Invention

The present invention relates to a motor control circuit, and more particularly, to a motor control circuit for controlling a motor to stay at/exit a braking state, and an operation method thereof.

2. Description of the Prior Art

A motor has many operation states such as states for clockwise rotation, counterclockwise rotation, stationary, and braking operations. A user needs to control and drive the motor through some peripheral circuits if he/she wants to maintain or change the current operation state of the motor. FIG. 1 is a diagram showing a prior art motor and a related peripheral circuit. The peripheral circuit of motor MT includes state control circuit 110 for controlling the operation state of the motor MT, a motor driving circuit composed of transistors M1-M4, and driving current detection circuit 120. The motor driving circuit composed of transistors M1-M4 is a well-known H-bridge driving circuit, supplying a driving current to a coil within motor MT so as to rotate motor MT. State control circuit 110 issues four control signals S1-S4 to respectively turn on/off transistors of the H-bridge driving circuit so that motor MT can operate in different states. Taking the clockwise rotation state as an example, state control circuit 110 issues corresponding control signals S1-S4 to turn on transistors M2 and M4 and turn off transistors M1 and M3, so a driving current $I_A$ flows into node A of the motor MT and out from node B of motor MT. In another example of the counterclockwise rotation state, transistors M1 and M3 are turned on and transistors M2 and M4 are off, so a driving current $I_B$ flows into node B of motor MT and then out from node A of motor MT. Driving current detection circuit 120 generates an error signal $S_E$ to state control circuit 110 according to a driving current passing through motor MT and a reference voltage $V_{ref}$. State control circuit 110 linearly controls the conductance of transistor M3/M4 according to the error signal $S_E$, so as to maintain the driving current passing through the motor MT at a specific value.

When a user desires to change the operation state of the motor MT to a desired state, for example, changing from the clockwise rotation state to the stationary state, the user should first make motor MT enter a braking state for a period and then make motor MT enter the desired operation state. This operation sequence is necessary to avoid damaging motor MT or transistors M1-M4. FIG. 2 is a diagram showing waveforms of control signals S3-S4 and waveforms of voltages $V_A$ and $V_B$ respectively at nodes A and B of motor MT in FIG. 1. Before time $T_1$, motor MT is in the clockwise rotation state. At time $T_1$, prior to enter motor MT into a stationary state for example, motor MT must enter a braking state such that state control circuit 110 issues corresponding control signals S1-S4 to turn on transistors M3 and M4 and turn off transistors M1 and M2. At this moment, motor MT does not receive any driving current from an external circuit; motor MT and turned-on transistors M3 and M4 form a short-circuit loop instead, gradually consuming residual energy stored in the motor MT. As can be expected, the residual current passing through the motor MT gradually decreases. After a period of time, motor MT is controlled to change from the braking state to the stationary state.

SUMMARY OF THE INVENTION

According to an embodiment of the present invention, a motor control circuit including a brake circuit and a control circuit is provided. The brake circuit is used for making the motor enter a braking state. The control circuit is used for detecting residual energy of the motor at the braking state and making the motor exit the braking state when the residual energy conforms to a predetermined criterion.

According to an embodiment of the present invention, a control method applied to a motor is further provided. The motor is controlled to enter a braking state. In the braking state, the residual energy of the motor is detected. The motor is controlled to exit the braking state when the residual energy conforms to a predetermined criterion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
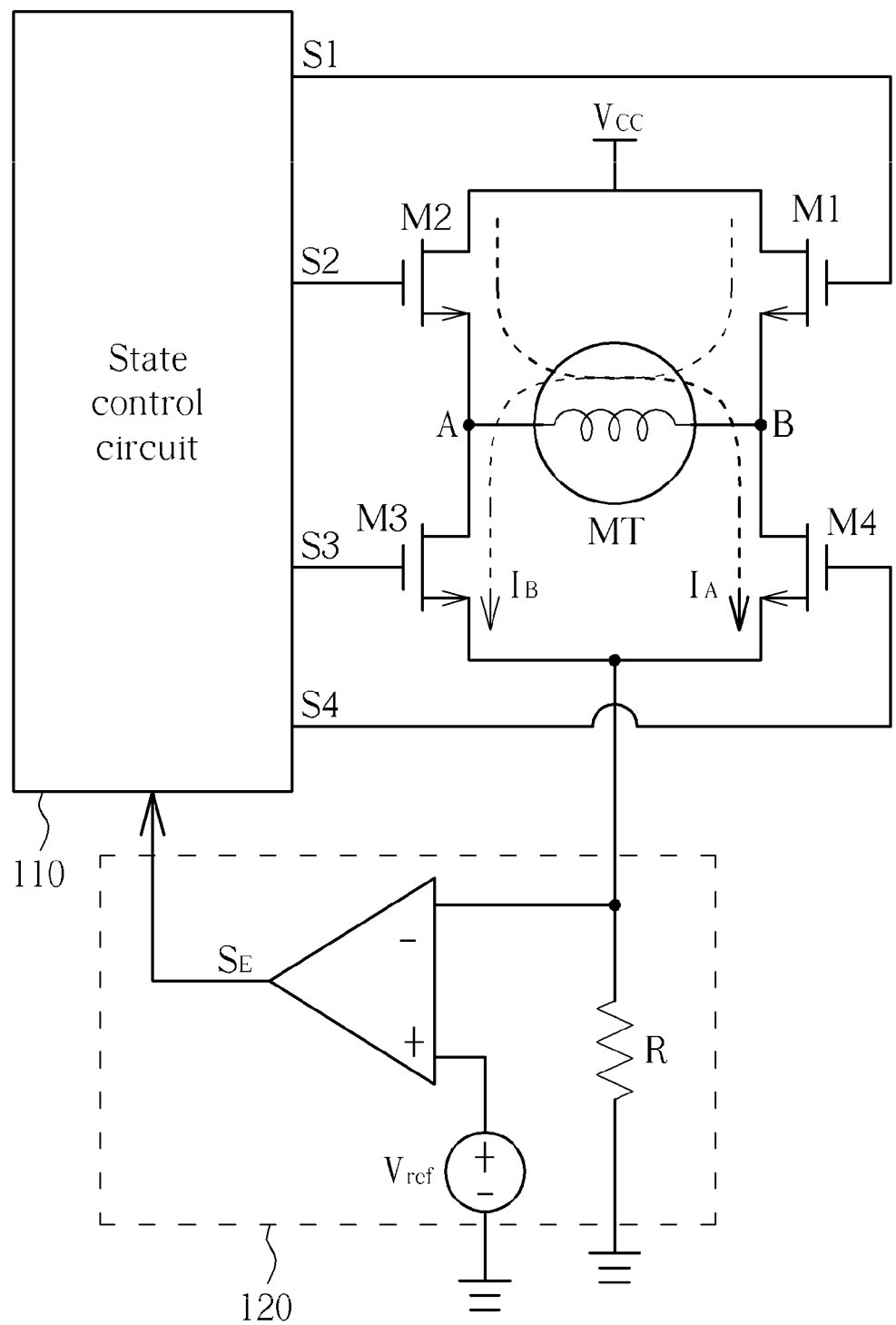
FIG. 1 is a diagram showing a prior art motor and a related peripheral circuit.
Figure 2:
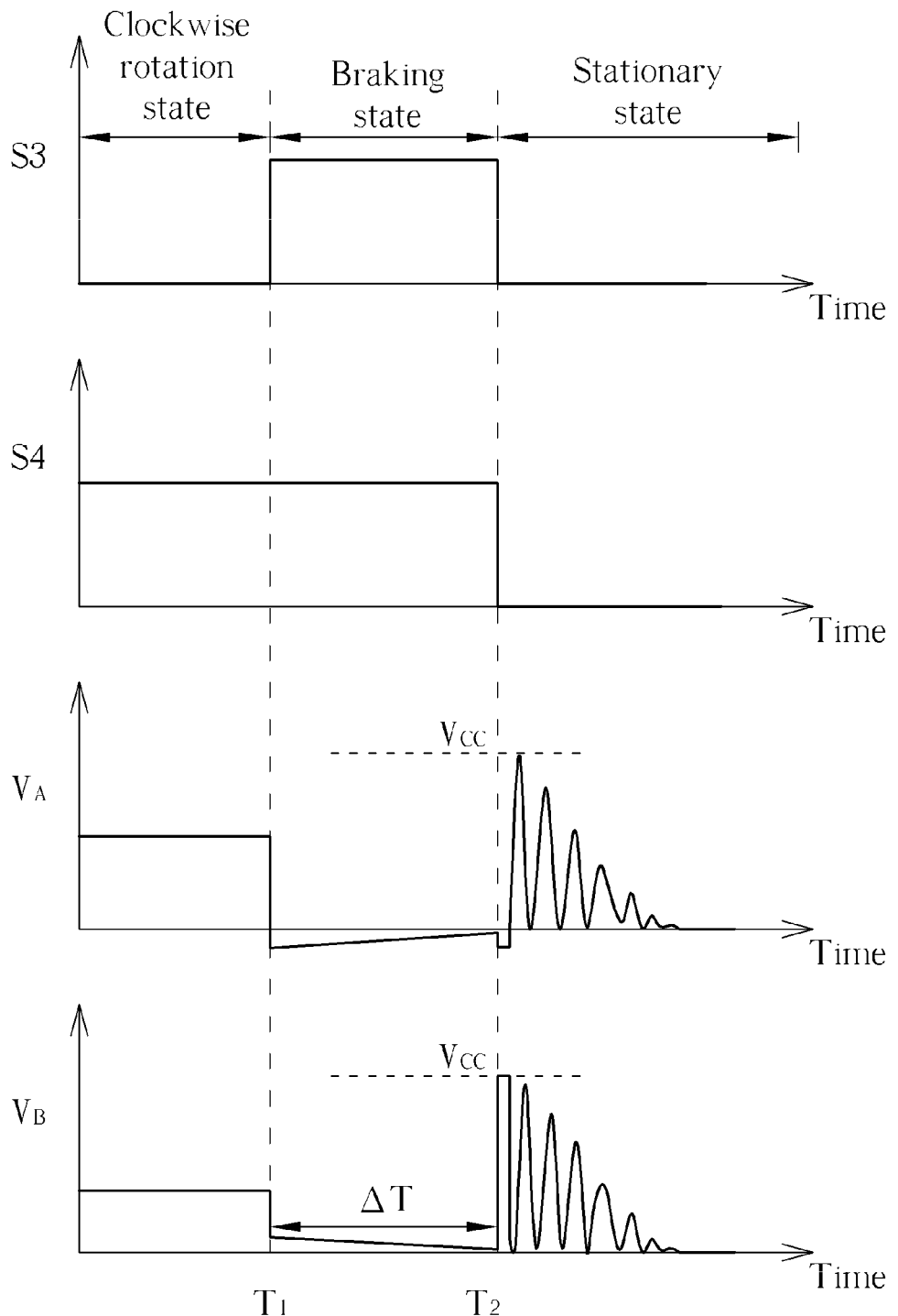
FIG. 2 is a diagram showing waveforms of control signals S3-S4 and waveforms of voltages $V_A$ and $V_B$ respectively at the nodes A and B of the motor MT in FIG. 1.

Please refer to FIG. 1 and FIG. 2 again. If a timer inside the state control circuit 110 immediately makes the motor MT enter the stationary state at time T2 (after a fixed braking time $\Delta T$), then the length of the fixed braking time $\Delta T$ is hard to determined for both too-short and too-long periods cause problems. If $\Delta T$ is too short, the motor MT may enter into the stationary state when the residual energy of the motor MT is not consumed enough, such that oscillating signals at the terminals of the motor MT caused by LC resonance may significantly pollute the power voltage source and deteriorate the performance of other devices. As exemplified in FIG. 2, the voltages $V_A$ and $V_B$ at output terminals A and B of the motor MT both vary sharply after time T2. In the opposite, a too-long $\Delta T$ may cause an unnecessary waiting for the motor state change.

Figure 3:
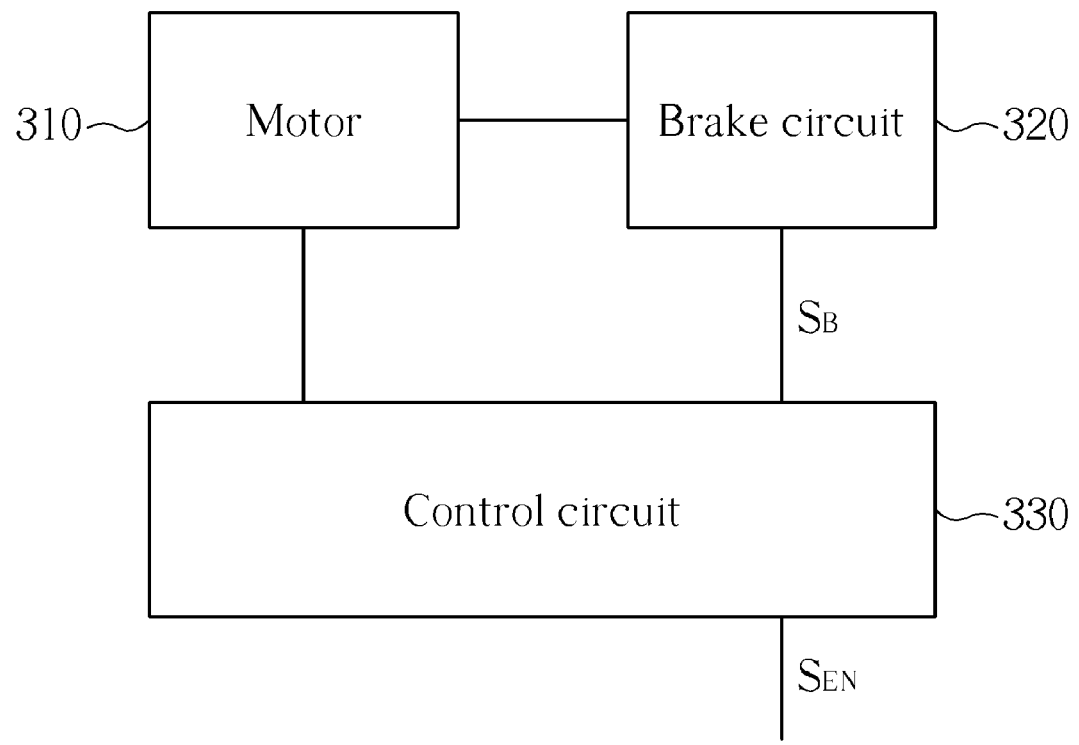
FIG. 3 is a diagram showing a motor and a motor control circuit for controlling the motor according to a first embodiment of the present invention.

FIG. 3 is a diagram showing a motor and a control circuit for controlling the motor according to an embodiment of the present invention. Motor 310 is an electrical equipment capable of transforming electric energy into mechanical energy, and is not limited to a DC motor driven by DC current, an AC motor driven by AC current, or a pulse motor driven by pulse current. Brake circuit 320 is coupled to motor 310 and used for making motor 310 enter the braking state, meaning that nodes A and B of the motor MT shown in FIG. 1 are electrically connected or short by brake circuit 320. Those skilled in this art should understand how to implement brake circuit 320 according to the type of motor 310. Control circuit 330, coupled to motor 310 and brake circuit 320, is utilized for detecting residual energy of motor 310 in the braking state and controlling the brake circuit 320 to make motor 310 leave the braking state when the residual energy conform to a predetermined criterion. When receiving a brake enable signal $S_{EN}$, control circuit 330 controls brake circuit 320 through a brake control signal $S_B$, making motor 310 enter the braking state. Meanwhile, the control circuit 330 starts detecting the residual energy of motor 310 in the braking state. When the residual energy conforms to a predetermined criterion, such as that a residual current passing through motor 310 is approximated to zero, control circuit 330 makes motor 310 leave the braking state. At this moment, by using the brake control signal $S_B$ to control brake circuit 320, control circuit 330 can make the motor 310 leave the braking state and thereby avoids oscillation signals with large amplitudes being generated at the output terminals of motor 310.

Figure 4:
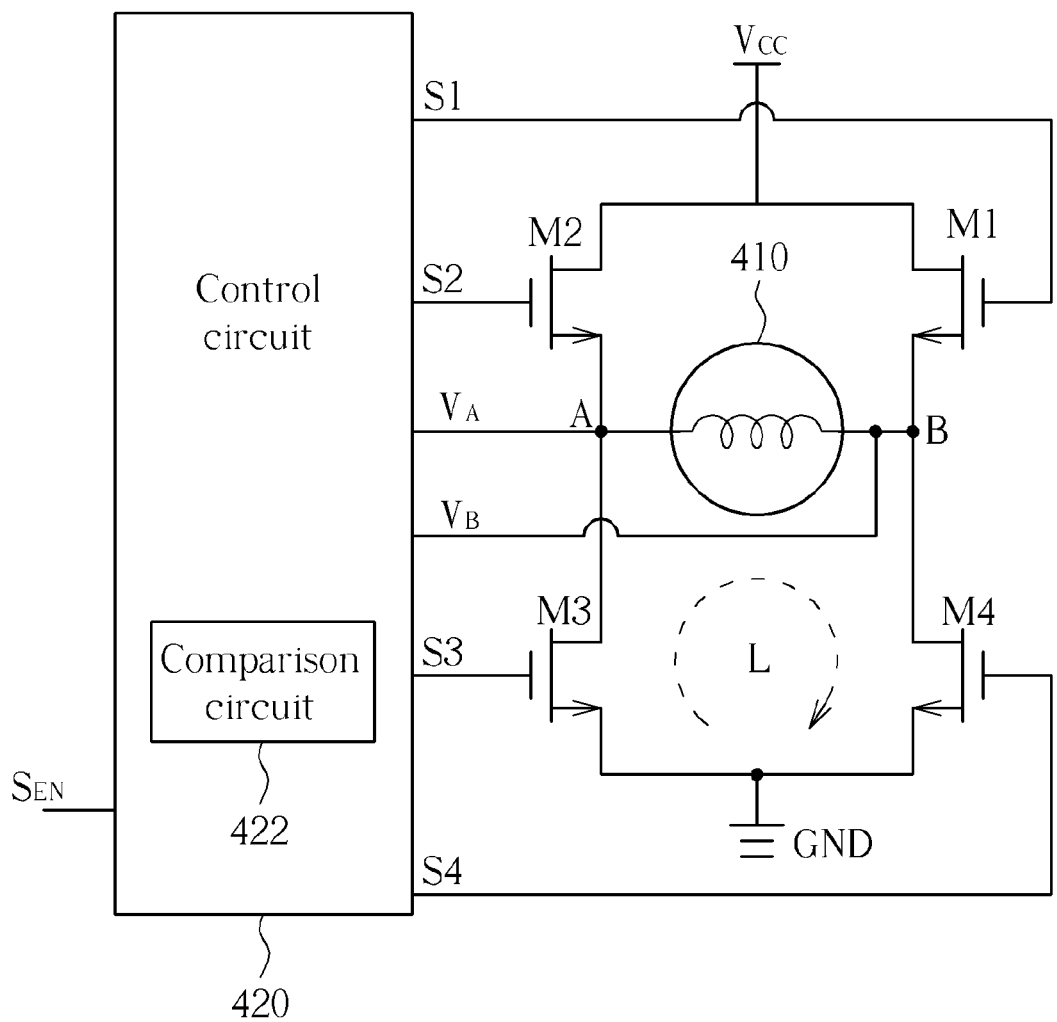
FIG. 4 is a diagram showing a motor control circuit and a motor according to a second embodiment of the present invention.

FIG. 4 is a diagram showing a motor control circuit and a motor in the braking state according to another embodiment of the present invention. In this embodiment, the motor control circuit includes control circuit 420 and an H-bridge driving circuit having transistors M1-M4. As described above, in the clockwise rotation state, control circuit 420 issues corresponding control signals S1-S4 to turn off transistors M1 and M3 but turn on transistors M2 and M4. A driving current is generated from the power supply $V_{CC}$ to flow through transistor M2, and into node A of motor 410, out from node B of the motor 410, through transistor M4 and, finally, into ground GND. When receiving a brake enable signal $S_{EN}$, control circuit 420 turn off transistors M1 and M2, and turn on transistors M3 and M4. Accordingly, nodes A and B of the motor 410 are connected via a short-circuit loop (symbolized by L in FIG. 4) such that motor 410 enters the braking state. In this situation, short-circuit loop L is generated due to the fact that motor 410 and transistors M3 and M4 do not receive a driving current from an external circuit. The residual current stored in motor 410 is gradually consumed by conductive resistance parasitically residing in loop L. Transistors M3 and M4, whose turn-on resistances help braking or discharging motor 410, are regarded as a brake circuit. In other embodiments, motor 410 can enter the braking state by turning on transistors M1 and M2 and turning off transistors M3 and M4, such that nodes A and B of the motor 410 are also connected via another short-circuit loop.

In this embodiment, the control circuit 420 includes a comparison circuit 422, which is used for determining whether the residual energy of the motor 410 in the braking state conforms to the predetermined criterion or not according to at least one of voltages $V_A$ and $V_B$ at nodes A and B of motor 410 respectively. If the previous state of motor 410 is a clockwise rotation state, then, in the present braking state, the residual current passing through motor 410 and the turned-on transistor M3 cause the voltage $V_A$ to be a negative voltage lower than the ground GND, such as −10 mV. Similarly, the residual current and the conductive resistance of transistor M4 cause the voltage $V_B$ to be a positive voltage higher than the ground GND, such as 10 mV. Since it may not be certain that motor 410 is in a clockwise or counterclockwise rotation state before entering the braking state, the voltage at only one of nodes A and B of motor 410 might not be enough to decide whether a discharge process provided in the braking state completes. This embodiment detects both voltages $V_A$ and $V_B$ to determine the time when the discharge process completes. Comparison circuit 422 determines that the residual energy of motor 410 conforms to the predetermined criterion, which identifies the complete of the discharge process, when voltages $V_A$ and $V_B$ are both smaller than a certain threshold voltage such as 3 mV. After the complete of the discharge process, control circuit 420 allows motor 410 to leave the braking state and then enter another operation state such as the stationary state. For example, control circuit 420 turns off transistors M1-M4 to thereby make motor 410 leave the braking state and enter the stationary state.

Additionally, according to one of voltages $V_A$ and $V_B$ and the current flow direction of the residual current, comparison circuit 422 can also determine whether the discharge process completes. For instance, if the motor 410 is in the clockwise rotation state before entering the braking state, comparison circuit 422 can set either a corresponding negative threshold voltage for the voltage $V_A$ or a corresponding positive threshold voltage for the voltage $V_B$, to determine whether the residual energy conforms to the predetermined criterion or not.

Furthermore, comparison circuit 422 can also decide whether the discharge process completes according to voltage difference between voltages $V_A$ and $V_B$. For instance, comparison circuit 422 decides that the discharge process to motor 410 completes when the voltage difference between voltages $V_A$ and $V_B$ is smaller than 6 mV.

Figure 5:
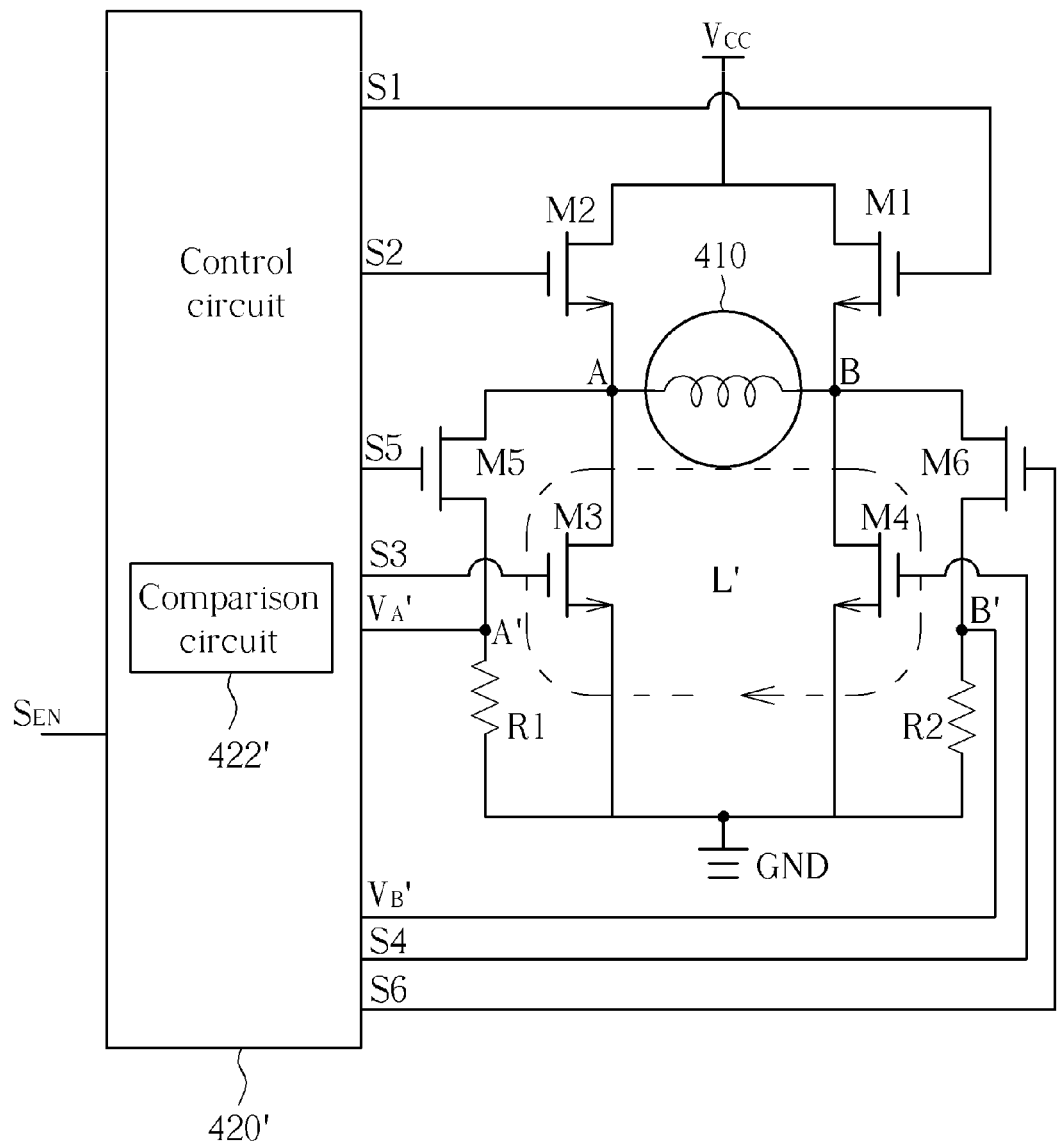
FIG. 5 is a diagram showing a motor control circuit and a motor according to a third embodiment of the present invention.

FIG. 5 is a diagram showing a motor control circuit and a motor in a braking state according to another embodiment of the present invention. Please note that elements having the same number in FIGS. 4-5 are implied to have similar operations/structures that are easily understandable to persons skilled in the art in view of previous description, and, thus, further description is not detailed for brevity. A major difference between embodiments of FIG. 4 and FIG. 5 is that the motor control circuit of FIG. 5 further includes resistors R1 and R2 and transistors M5 and M6 controlled by the control circuit 420'. Transistor M5 includes a drain terminal coupled to node A of motor 410, a source terminal coupled to resistor R1, and a gate terminal coupled to receive brake control signal S5. Transistor M6 includes a drain terminal coupled to node B of motor 410, a source terminal coupled to resistor R2, and a gate terminal coupled to receive brake control signal S6. In addition, as shown in FIG. 5, one terminal of resistor R1 or R2 is coupled to ground GND.

Since the conductive resistances of transistors M3 and M4 shall be very small, the voltage at nodes $V_A$ and $V_B$ of FIG. 4 caused by the conductive resistances of transistors M3 and M4 in a braking state may be too little to detect. In FIG. 5, the control circuit 420' detects the residual current through motor 410 by detecting voltages $V_A'$ and $V_B'$ at the resistors R1 and R2, to determine whether the residual energy of motor 410 conforms to the predetermined criterion. For example, after receiving the brake enable signal SEN, control circuit 420' uses corresponding control signals S1-S4 to turn off transistors M1-M4 and uses the brake control signals S5-S6 to turn on transistors M5 -M6, so as to make the motor 410 enter the braking state. A short-circuit loop L' as illustrated in FIG. 5 is formed by motor 410 and the turned-on transistors M5-M6, and the motor 410 does not receive a driving current from an external element. The residual current passing through the motor 410 is gradually consumed by conductive resistances of the turned-on transistors M5-M6, and resistors R1-R2, and all parasitic resistances along the loop L'. In this situation, transistors M5-M6 and resistors R1-R2 can be regarded as a brake circuit to motor 410. A user can appropriately design the resistances of the resistors R1-R2 to set appropriate threshold levels for voltages $V_A$ and $V_B$. Resistors R1-R2 each having larger resistance than the conductive resistance of a corresponding turned-on transistor can also speed up the discharge operation for motor 410.

Moreover, after receiving the brake enable signal $S_{EN}$, the control circuit 420' may use corresponding control signals S1-S6 to turn off transistors M1-M2 and turn on transistors M3-M6, so as to make motor 410 enter the braking state. A short-circuit loop L' is formed by motor 410 and transistors M3-M6. Transistors M3-M6 and resistors R1-R2 can be regarded as a brake circuit to motor 410. To simplify control signaling, an implementation can be achieved by designing transistors M3 and M5 to receive a common control signal, and transistors M4 and M6 to receive another common control signal. Furthermore, the physical sizes of the transistors M5-M6 can be respectively designed to be much smaller than those of the transistors M3-M4 such that currents passing through the transistors M5-M6 are respectively far smaller than those passing through the transistors M3-M4. Accordingly, during the operation at the clockwise rotation state or counterclockwise rotation state, most of operation current will flow through transistor M3 or M4 and the energy consumed by transistor M5/M6 and resistor R1/R2 can be negligible.

Similarly, based on at least one of voltages $V_A'$ and $V_B'$, comparison circuit 422' of control circuit 420' can determine whether the residual energy of motor 410 conforms to a predetermined criterion or not. For example, when the voltages $V_A'$ and $V_B'$ are both lower than a threshold voltage, the voltage difference between the voltages $V_A'$ and $V_B'$ is lower than a threshold value, or one of the voltages $V_A'$ and $V_B'$ is lower/higher than a threshold value, comparison circuit 422' can decide that the residual energy of motor 410 conforms to the predetermined criterion. Control circuit 420' then permits motor 410 to leave the braking state.

Figure 6:
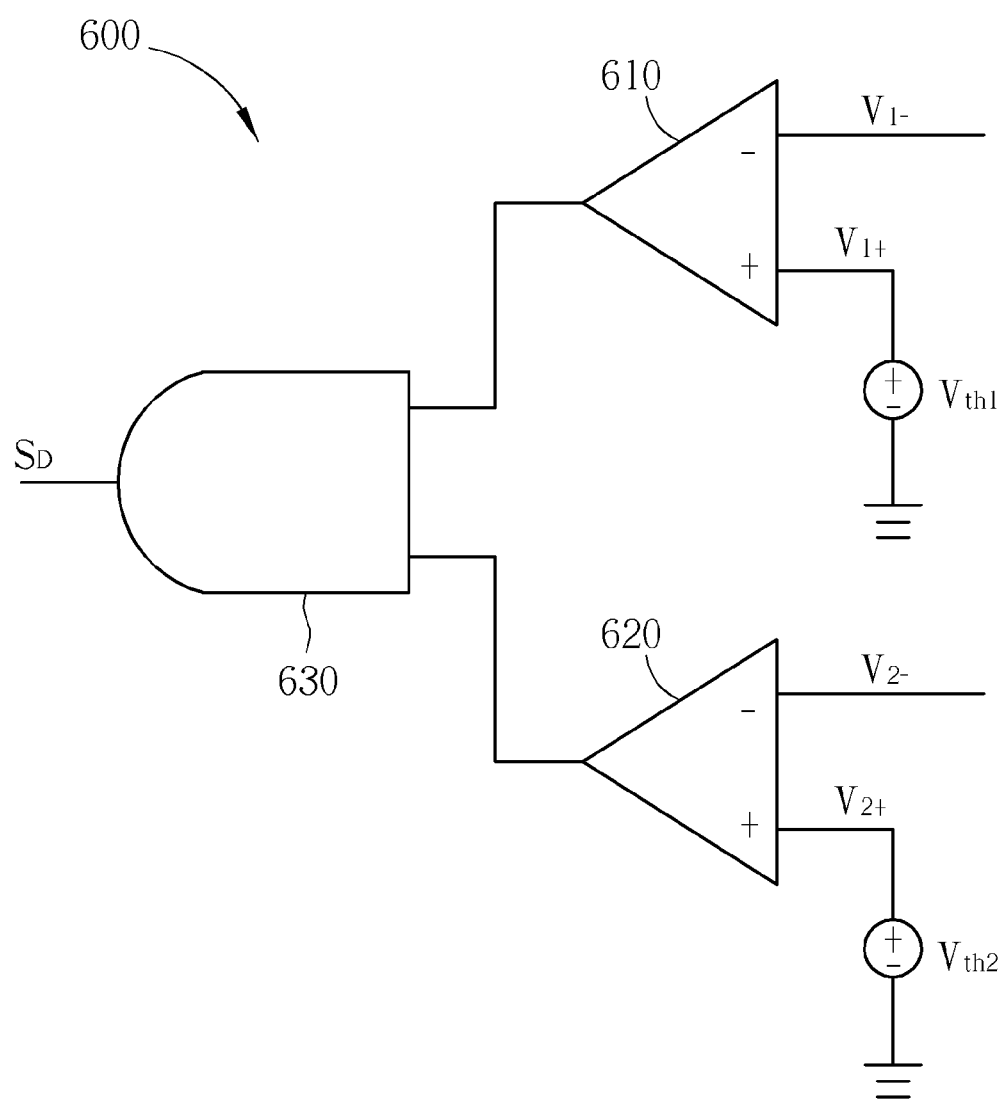
FIG. 6 is a diagram of a comparison circuit according to an embodiment of the present invention.

FIG. 6 is a diagram of a comparison circuit according to an embodiment of the present invention. Comparison circuit 420 of FIG. 4 and comparison circuit 420' of FIG. 5 can be realized by comparison circuit 600 shown in FIG. 6. Comparison circuit 600 includes comparator 610, comparator 620, and logic unit 630. Comparator 610 has positive input terminal $V_{1+}$ coupled to threshold voltage $V_{th1}$ and negative input terminal $V_{1-}$ coupled to voltage $V_A$ of FIG. 4. When voltage $V_A$ is lower than threshold voltage $V_{th1}$, comparator 610 outputs a logic high voltage level to logic unit 630; when voltage $V_A$ is not lower than $V_{th1}$, comparator 610 outputs a logic low voltage level to the logic unit 630. Second comparator 620 has positive input terminal $V_{2+}$ coupled to threshold voltage $V_{th2}$ and negative input terminal $V_{2-}$ coupled to voltage $V_B$ of FIG. 4. When voltage $V_B$ is lower than threshold voltage $V_{th2}$, comparator 620 outputs a logic high voltage level to logic unit 630, whereas comparator 620 outputs a logic low voltage level to logic unit 630 when voltage $V_B$ is not lower than $V_{th2}$. Then, logic unit 630 can determine whether the residual energy of a motor conforms to a predetermined criterion according to comparison results of comparators 610 and 620. For instance, logic unit 630 can be a logic AND unit. When comparators 610 and 620 both output logic high voltage levels to the logic unit 630, the logic unit 630 outputs a discharge completion signal $S_D$ having a logic high voltage level, to indicate that the residual energy has conformed to the predetermined criterion. Please note that it is preferable but not limited that the values of threshold voltages $V_{th1}$ and $V_{th2}$ are identical in this embodiment. Additionally, in other embodiments, a user can couple negative input terminals $V_{1-}$ and $V_{2-}$ of comparison circuit 600 to voltages $V_A'$ and $V_B'$ of FIG. 5 respectively, for determining whether the residual energy conforms to the predetermined criterion according to voltages $V_A'$ and $V_B'$.

Figure 7:
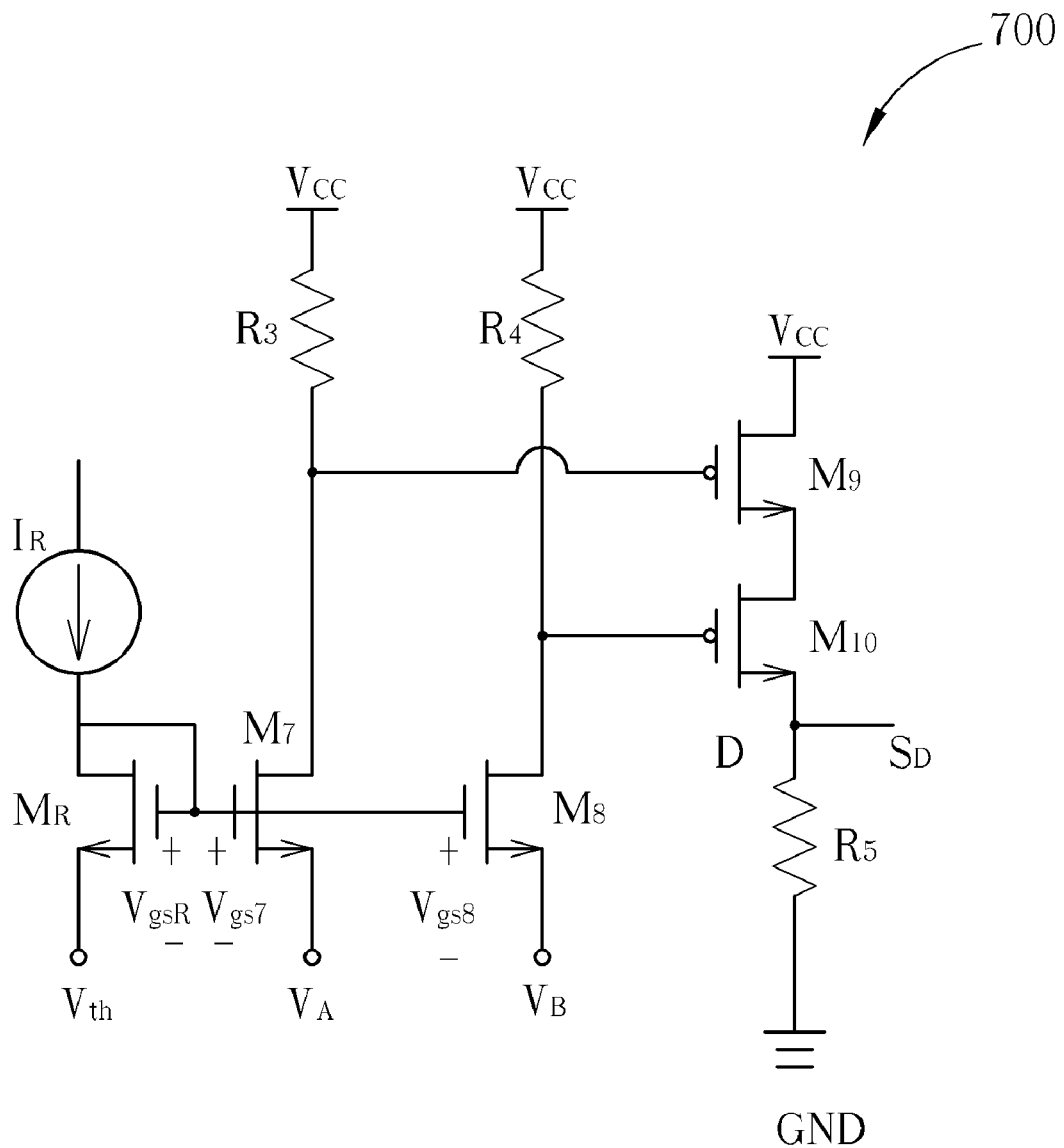
FIG. 7 is a diagram of a comparison circuit according to another embodiment of the present invention.

FIG. 7 is a diagram of a comparison circuit according to another embodiment of the present invention. Comparison circuit 420 of FIG. 4 or comparison circuit 420' of FIG. 5 can be implemented by using comparison circuit 700 shown in FIG. 7. Comparison circuit 700 includes a reference current source $I_R$, a reference transistor $M_R$, N-type transistors M7 and M8, P-type transistors M9 and M10, and resistors R3-R5. Reference transistor $M_R$ has a drain terminal coupled to the reference current source $I_R$, a source terminal coupled to a threshold voltage $V_{th}$, and a gate terminal coupled to its drain terminal. Transistor M7 has a drain terminal coupled to the supply voltage $V_{CC}$ via resistor R3, a source terminal coupled to voltage $V_A$ of FIG. 4, for example, and a gate terminal coupled to the gate terminal of reference transistor $M_R$. Transistor M8 has a drain terminal coupled to the supply voltage $V_{CC}$ via the resistor R4, a source terminal coupled to the voltage $V_B$ of FIG. 4, and a gate terminal coupled to the gate terminal of reference transistor $M_R$. Transistors M9 and M10 and resistor R5 compose a logic unit for determining whether the residual energy of a motor conforms to a predetermined criterion based on voltages respectively at the source terminals of transistors M7 and M8.

Reference current $I_R$ passes through reference transistor $M_R$ such that the voltage difference $Vgs_R$ between the gate and source terminals of the reference transistor $M_R$ becomes fixed. If the voltage level of voltage $V_A$ is less than that of $V_{th}$, transistor $M_7$ is on; if not, transistor $M_7$ is off. A turned-on transistor $M_7$ pulls low the gate voltage of transistor $M_9$, turning on transistor $M_9$; or, in the opposite, a turned-off transistor $M_7$ turns off transistor $M_9$. The operations of transistors $M_8$ and $M_{10}$ are similar with that of transistors $M_7$ and $M_9$, such that their explanations are omitted for brevity. Only if both transistors $M_9$ and $M_{10}$ are on, then discharge completion signal $S_D$ has a logic high voltage level; otherwise, discharge completion signal $S_D$ has a logic low output level. Accordingly, discharge completion signal $S_D$ with a logic high voltage level can be an indicator indicating that both voltages $V_A$ and $V_B$ are less than threshold voltage $V_{th}$, and that the discharge process to the motor has been accomplished. At this moment, the residual energy of the motor conforms to the predetermined criterion. It should be noted that, in other embodiments, a user may couple the drain terminals of the transistors M7 and M8 to voltages $V_A'$ and $V_B'$, respectively, of FIG. 5, or to voltages $V_A$ and $V_B$, respectively, of FIG. 4 for determining whether the residual energy of a motor conforms to a predetermined criterion.

Figure 8:
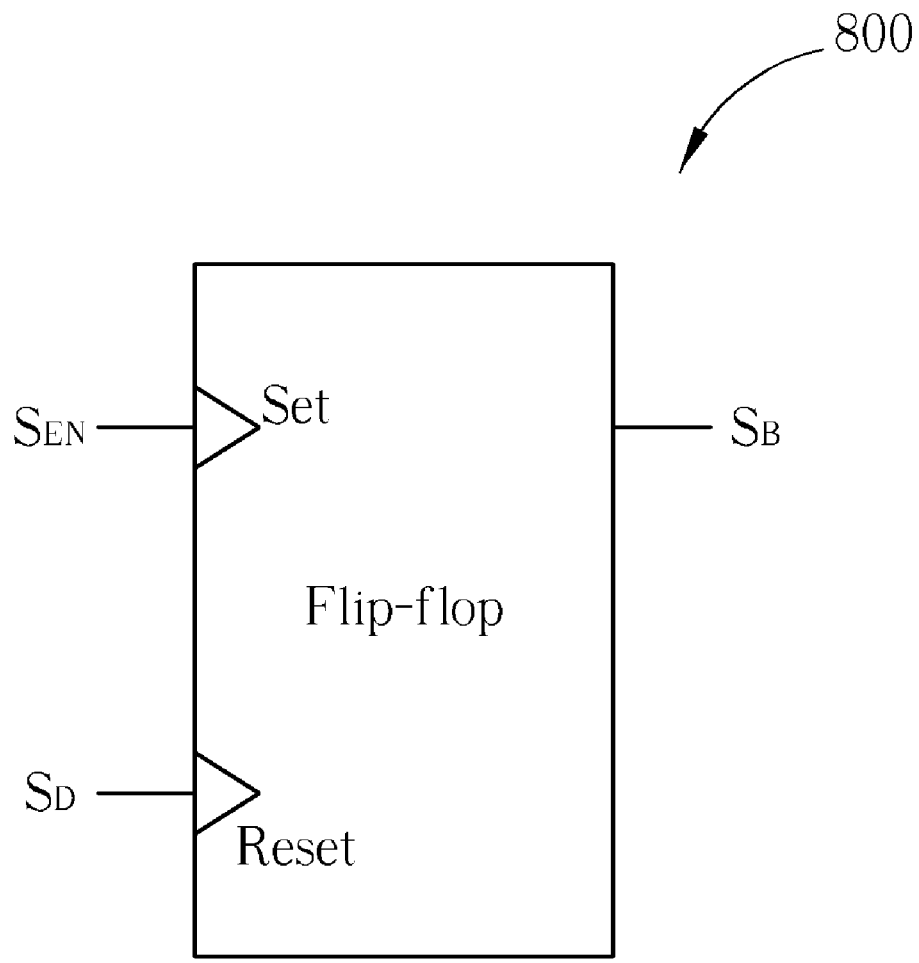
FIG. 8 is a diagram of a flip-flop applied to a control circuit according to an embodiment of the present invention.
Figure 9:
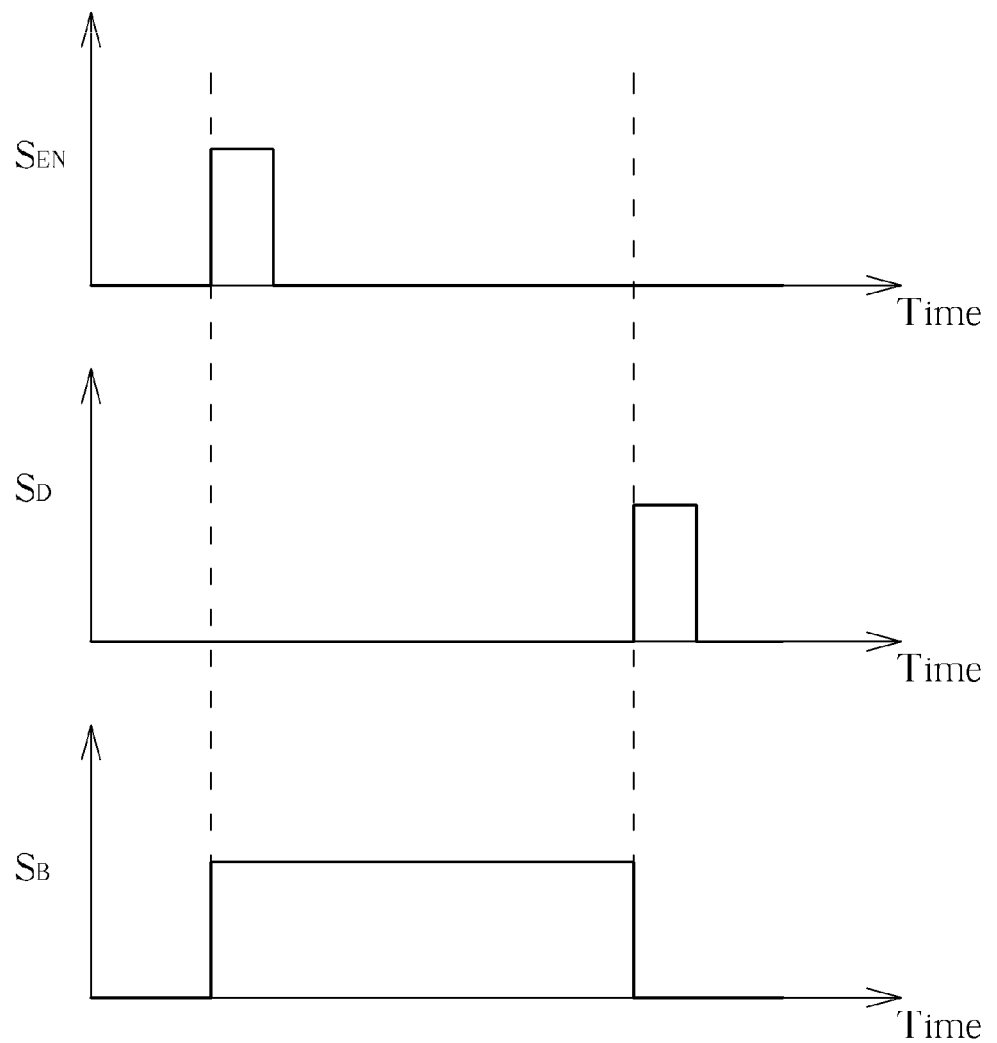
FIG. 9 is a diagram showing waveforms of a brake control signal, a brake enable signal, and a discharge completion signal.

FIG. 8 is a diagram of a flip-flop applied to a control circuit according to an embodiment of the present invention. Control circuit 420 of FIG. 4 or control circuit 420' of FIG. 5 also includes flip-flop 800, which is used for generating a brake control signal $S_B$ to control a brake circuit for making a motor enter/leave a braking state. Flip-flop 800 is triggered by brake enable signal $S_{EN}$ via set terminal Set and it is triggered by discharge completion signal $S_D$ via reset terminal Reset. Accordingly, in this embodiment, flip-flop 800 sets brake control signal $S_B$ according to brake enable signal $S_{EN}$ and clears brake control signal $S_B$ according to discharge completion signal $S_D$ which indicates that the residual energy of a motor conforms to the predetermined criterion. Please refer to FIG. 9. FIG. 9 is a diagram showing waveforms of the brake control signal $S_B$, brake enable signal $S_{EN}$, and the discharge completion signal $S_D$. Brake control signal $S_B$ with at a high voltage level indicates that the motor is in the braking state; otherwise, it indicates that the motor is not in the braking state.

Please note that the conventional scheme for linearly controlling the conductance of a transistor to fix the driving current can be applied to each embodiment of the present invention. For example, the driving current detection circuit 120 in FIG. 1 can also be positioned between ground GND and a connection node of the transistors M3 and M4 in FIG. 4 or in FIG. 5.

To summarize, the apparatus and related methods provided by the embodiments of the present invention monitor residual energy of a motor to determine whether the motor has been discharged completely or not, and the motor is allowed to exit the brake state when the residual energy has reached a safe range. Therefore, the apparatus can avoid the residual energy becoming too high and causing oscillation voltage with large amplitude at the output terminals of the motor. In other words, the apparatus of the present invention can prevent damage to the motor and the related peripheral circuit.

Those skilled in the art will readily observe that numerous modifications and alterations of the device and method may be made while retaining the teachings of the invention.

What is claimed is:

1. A motor control circuit for controlling a motor, comprising:
    a brake circuit, for making a first node and a second node of the motor form a short-circuit loop, so as to make the motor enter a braking state; and
    a control circuit, for detecting residual energy of the motor in the brake state, and for making the motor exit the braking state when the residual energy conforms to a predetermined criterion;
    wherein the brake circuit comprises:
        a first transistor, coupled to the first node;
        a second transistor, coupled to the second node;
        a first resistor, connected to the first transistor in series; and
        a second resistor, connected to the second transistor in series;
        wherein the short-circuit loop is formed when the first and second transistors become conductive, and the residual energy is determined according to at least one of a voltage drop across the first resistor and a voltage drop across the second resistor.

2. The motor control circuit of claim 1, wherein the residual energy is determined according to a residual current passing through the motor.

3. The motor control circuit of claim 1, wherein the residual energy is determined according to at least one of a first voltage at the first node and a second voltage at the second node.

4. The motor control circuit of claim 3, wherein the control circuit comprises a comparison circuit for determining whether the residual energy conforms to the predetermined criterion, and the comparison circuit determines that the residual energy conforms to the predetermined criterion when at least one of the first and second voltages is lower than a threshold voltage.

5. The motor control circuit of claim 4, wherein the comparison circuit comprises:
    a first comparator, for outputting a first comparison result according to the threshold voltage and the first voltage;
    a second comparator, for outputting a second comparison result according to the threshold voltage and the second voltage; and
    a logic unit, for determining whether the residual energy conforms to the predetermined criterion according to the first and second comparison results.

6. The motor control circuit of claim 4, wherein the comparison circuit comprises:
    a reference transistor, having a first terminal coupled to a reference current, a second terminal coupled to the threshold voltage, and a control terminal coupled to the first terminal of the reference transistor;
    a first resistor;
    a second resistor;
    a first transistor, having a first terminal coupled to a logic high voltage level via the first resistor, a second terminal coupled to the first voltage, and a control terminal coupled to the control terminal of the reference transistor;
    a second transistor, having a first terminal coupled to the logic high voltage level via the second resistor, a second terminal coupled to the second voltage, and a control terminal coupled to the control terminal of the reference transistor; and
    a logic unit, coupled to the first and second transistors, for determining whether the residual energy conforms to the predetermined criterion according to a voltage at the first terminal of the first transistor and a voltage at the first terminal of the second transistor.

7. The motor control circuit of claim 1, wherein the brake circuit further comprises:
    a third transistor, connected to the first node and the first transistor;
    a fourth transistor, connected to the second node and the second transistor; and
    wherein the first resistor is connected to the third transistor in series, and the second resistor is connected to the fourth transistor in series.

8. The motor control circuit of claim 1, wherein the control circuit comprises a comparison circuit determining that the residual energy conforms to the predetermined criterion when at least one of the voltage drop across the first resistor and the voltage drop across the second resistor is lower than a threshold voltage.

9. The motor control circuit of claim 8, wherein the comparison circuit comprises:
    a first comparator, for outputting a first comparison result according to the threshold voltage and the voltage drop across the first resistor;
    a second comparator, for outputting a second comparison result according to the threshold voltage and the voltage drop across the second resistor; and
    a logic unit, for determining whether the residual energy conforms to the predetermined criterion according to the first and second comparison results.

10. The motor control circuit of claim 1, wherein the control circuit comprises a flip-flop for setting a brake control signal according to a brake enable signal and clearing the brake control signal according to whether the residual energy conforms to the predetermined criterion, wherein the brake control signal controls the brake circuit so as to make the motor stay at or leave the braking state.

11. A motor control circuit for controlling a motor, comprising:
    a brake circuit, for making a first node and a second node of the motor form a short-circuit loop, so as to make the motor enter a braking state; and a control circuit, for detecting residual energy of the motor in the brake state, and for making the motor exit the braking state when the residual energy conforms to a predetermined criterion;

wherein the control circuit comprises:
 a comparison circuit for determining whether the residual energy conforms to the predetermined criterion, and the comparison circuit determines that the residual energy conforms to the predetermined criterion when at least one of the first and second voltages is lower than a threshold voltage, and the comparison circuit comprises:
  a first comparator, for outputting a first comparison result according to the threshold voltage and the first voltage;
  a second comparator, for outputting a second comparison result according to the threshold voltage and the second voltage; and
  a logic unit, for determining whether the residual energy conforms to the predetermined criterion according to the first and second comparison results;
 wherein the residual energy is determined according to at least one of a first voltage at the first node and a second voltage at the second node.

12. A motor control circuit for controlling a motor, comprising:
 a brake circuit, for making a first node and a second node of the motor form a short-circuit loop, so as to make the motor enter a braking state; and
 a control circuit, for detecting residual energy of the motor in the brake state, and for making the motor exit the braking state when the residual energy conforms to a predetermined criterion;

wherein the control circuit comprises:
 a comparison circuit for determining whether the residual energy conforms to the predetermined criterion, and the comparison circuit determines that the residual energy conforms to the predetermined criterion when at least one of the first and second voltages is lower than a threshold voltage, and the comparison circuit comprises:
  a reference transistor, having a first terminal coupled to a reference current, a second terminal coupled to the threshold voltage, and a control terminal coupled to the first terminal of the reference transistor;
  a first resistor;
  a second resistor;
  a first transistor, having a first terminal coupled to a logic high voltage level via the first resistor, a second terminal coupled to the first voltage, and a control terminal coupled to the control terminal of the reference transistor;
  a second transistor, having a first terminal coupled to the logic high voltage level via the second resistor, a second terminal coupled to the second voltage, and a control terminal coupled to the control terminal of the reference transistor; and
  a logic unit, coupled to the first and second transistors, for determining whether the residual energy conforms to the predetermined criterion according to a voltage at the first terminal of the first transistor and a voltage at the first terminal of the second transistor;
 wherein the residual energy is determined according to at least one of a first voltage at the first node and a second voltage at the second node.

\* \* \* \* \*